United States Patent [19]

Henry

[11] 4,339,402
[45] Jul. 13, 1982

[54] BATCH PELLETIZING: A MEANS FOR MEASURING PELLET SIZE DURING THE FORMING PROCESS

[75] Inventor: Richard K. Henry, Heath, Ohio

[73] Assignee: Owens-Corning Fiberglas Corporation, Toledo, Ohio

[21] Appl. No.: 95,268

[22] Filed: Nov. 29, 1979

Related U.S. Application Data

[63] Continuation-in-part of Ser. No. 974,470, Dec. 29, 1978, abandoned.

[51] Int. Cl.³ .............................................. B01J 2/14
[52] U.S. Cl. .................................. 264/40.1; 264/117; 425/140; 425/145; 425/147; 425/222
[58] Field of Search ............... 264/40.1, 117; 425/222, 425/140, 145, 147

[56] References Cited

U.S. PATENT DOCUMENTS 4,212,613  7/1980  Seng ..................................... 425/141

Primary Examiner—James R. Hall
Attorney, Agent, or Firm—Ronald C. Hudgens; Patrick P. Pacella; Paul T. Kashimba

[57] ABSTRACT

A method of and apparatus for pelletizing a batch of particulate material comprising: supplying particulate batch material to a slanted rotatable surface; supplying liquid to the surface to render the particles with the ability to adhere to one another upon impaction; rotating the surface in a given direction to cause the particles and newly formed pellets to move up along the surface and then downwardly at least partially under the influence of gravity so as to move in generally elliptical paths, whereby individual particles are caused to impact against one another and adhere thereto to form pellets; sensing the depth of substantially finished pellets at a downward portion of an elliptical path; and changing the ratio of liquid to particulate batch material in response to a change in the depth that is sensed.

9 Claims, 4 Drawing Figures

BATCH PELLETIZING: A MEANS FOR MEASURING PELLET SIZE DURING THE FORMING PROCESS

CROSS REFERENCES

This application is a continuation-in-part of copending application U.S. Ser. No. 974,470, which was filed Dec. 29, 1978 now abandoned.

BACKGROUND OF THE INVENTION

This invention relates to the formation of pellets for use in a melting furnace and, more particularly, to the formation of pellets for use in a glass melting furnace.

Copending U.S. application Ser. No. 965,632 now U.S. Pat. No. 4,212,613, Seng, filed on Dec. 1, 1978, discloses the formation of batch material into pellets by adding the batch material and liquid, such as water, to a rotary pelletizer. Rotation of the pelletizer mixes the batch material with the liquid such that the batch material added to the pelletizer evolves from a batch appearance to non-adhering discernible nuclei or seeds which gradually grow as they are moved around the pelletizer by the pelletizer's motion. The finished pellets may be placed directly into a melter or supplied to a heat exchanger through which hot gases from either the melter or an external source are passed. Preferably, the pellets are dried and preheated in accordance with the teachings of Hohman, Seng, Henry and Propster in U.S. Pat. Nos. 4,248,615 and 4,248,616. The preheating of the pellets provides an energy savings since less energy is required to melt the batch. In addition, the hot exhaust gases from the furnace contain useful batch particulates that are imparted to the batch, thereby allowing recovery of this material which would otherwise be expelled into the atmosphere.

The components of the batch material supplied to the pelletizer tend to segregate during transportation thereto. This segregation is not harmful to the operation of a glass furnace, since the components of the pellets average out over a period of time. However, the short variations in the batch components affect the pellet forming ability of the batch material, and hence the size of the finished pellets. Certain glass batches have particle sizes that vary widely, thus resulting in greater segregation and variation of the batch than for other batches. In addition, the feed rate of the batch to the pelletizer may vary. Therefore, it is necessary to accurately predict the size of the pellets being formed within the pelletizer so that the water being supplied to the pelletizer can be controlled to respond to variations in the composition of the batch and/or the rate of feed of the batch, thereby producing pellets within the desired tolerance. As is known in the art, increasing the amount of water supplied to the pelletizer increases the size of the finished pellets; whereas, decreasing the amount of water reduces the size of the finished pellets.

The pellets should be uniform within a prescribed tolerance. Generally, pellets having a nominal diameter of one-half inch, with a range of three-eighths to five-eighths inch, have been found to be the optimum size for obtaining maximum heat transfer from the hot combustion gases to the pellets. If the pellets are too small, they excessively restrict the flow of gases through the preheater; whereas, if the pellets are too large, the surface to weight ratio is reduced which results in less heat being transferred to the pellets. Furthermore, the large pellets may have moisture trapped therein which may cause them to explode when the moisture turns to steam.

A rotary pelletizer can be divided into contiguous sections with each formative stage of the pellets pertaining to a respective section of the pelletizer. Generally, the lighter pellets, which are in the earliest formative stages, will be propelled in the widest rotational path and will follow an elliptical path with the widest circular orbit. As the pellets become heavier, the motion or path of the pellets will become more elliptical, since the heavier pellets will experience a deceleration sooner than the lighter pellets. Accordingly, it is possible to identify the formative stages as well as the relative sizes of the pellets on a cross section of the pelletizer, by identifying the appropriate sector in that cross section.

Seng, U.S. Pat. No. 4,212,613, discloses the use of a pelletizer having a rotating disc, a sensor for detecting variations in the batch level and means operatively connected to the sensor for varying the amount of water supplied to the pelletizer in response to the sensed batch level. The sensor is positioned generally at an upward portion of the disc where it is contacted during the pelletization process by an upwardly moving stream of batch material prior to the formation of non-adhering discernible pellet seeds. For certain glasses, namely low alkali-alkaline earth-aluminoborosilicate glasses, this arrangement has worked quite well, providing a shortened control loop for controlling the size of the finished pellets.

Typically, the low alkali-alkaline earth-aluminoborosilicate glasses contain alkali metal oxides in an amount that is less than 3% by weight and, more typically, less than 1% by weight, if at all. Generally, the cumulative amount of silica, alumina, alkaline earth metal oxides and boric oxide will comprise at least about 85% by weight and, more commonly, on the order of about 93–95% by weight of such glasses. The typical batch ingredients which are admixed prior to pelletization are sand, limestone, clay and a calcium borate, such as, calcined colemanite. An example of such glasses is that commonly referred to in the art as an E-type textile glass.

In contrast to such low alkali-alkaline earth-aluminoborosilicate glasses, it has been found that the location of the sensor disclosed in Seng does not produce the degree of desired sensitivity and control in pelletizing other glass batches. Exemplary of such glasses where the desired sensitivity and control of the pellet forming means is not obtained, are the soda containing glasses, for example, those glasses in which $Na_2O$ is present in an excess of about 5% by weight and, more typically, in an amount of about 10–20% by weight. Such glasses are represented by the common soda lime silica glasses, in which the cumulative amount of silica, calcium oxide and sodium oxide are in excess of about 60% by weight, preferably in excess of about 75% by weight and more preferably in excess of about 90% by weight of the glass, and by alkali-alkaline earth-aluminoborosilicates.

Therefore, it is an object of this invention to provide a method of and apparatus for pelletizing a batch of particulate material for such alkali-alkaline earth-aluminoborosilicate glass.

SUMMARY OF THE INVENTION

In accordance with the present invention there is provided a method of pelletizing a batch of particulate material, such method comprising: (a) supplying particulate batch material to a slanted rotatable surface; (b) supplying liquid to the surface to render the particles with the ability to adhere to one another upon impaction; (c) rotating the surface in a given direction to cause the particles and newly formed pellets to move up along the surface and then downwardly at least partially under the influence of gravity so as to move in generally elliptical paths, whereby individual particles are caused to impact against one another and adhere thereto to form pellets; (d) sensing the depth of substantially finished pellets at a downward portion of an elliptical path; and (e) changing the ratio of liquid to particulate batch material in response to a change in the depth that is sensed.

In addition, the invention provides a method of pelletizing a batch of particulate material comprising steps (a)-(c) of the method discussed above and (d) sensing the angle of repose of substantially finished pellets at a downward portion of an elliptical path, and (e) changing the ratio of liquid to particulate batch material in response to a change in the angle of repose that is sensed.

Further, the invention provides an apparatus for pelletizing a batch of particulate material, such apparatus comprising: (a) pellet forming means having a movable surface comprising a slanted rotatable member; (b) means for supplying particulate batch material to the pellet forming means; (c) means for supplying liquid to the pellet forming means; (d) means for rotating the rotatable member in a given direction to cause the particulate batch material to move upwardly and then downwardly at least partially under the influence of gravity so as to move in generally elliptical paths, the apparatus being so arranged and constructed that the liquid and particulate batch material combine to form pelletized batch material; (e) means for sensing the depth of substantially finished pellets at a downward portion of a generally elliptical path; and, (f) means for changing the ratio of liquid to particulate batch material in response to the depth sensed by the sensing means.

The present invention is outstandingly adapted for the control of the pellet forming means in producing pellets for the alkali-alkaline earth-aluminoborosilicate glasses, especially of the type commonly manufactured in the fibrous glass producing industry for insulation purposes. Exemplary of such glasses are those in which the cumulative total weight percent of silica, aluminum oxide, boron oxide, alkali metal oxides and alkaline earth metal oxides is in excess of about 75 or 80% by weight and, more typically, in excess of about 96-97% by weight of the glass. Specifically exemplary of such glasses are the soda lime aluminoborosilicate glasses in which the raw materials employed preferably include burnt dolomite, clay, limestone, sand and the source of $Na_2O$ being a sodium carbonate, preferably soda ash, or sodium hydroxide. The preferred source of $B_2O_3$ for such batches will be a sodium calcium borate, for example, ulexite and/or probertite. If the latter materials contain significant amounts of volatile species which tend to decrepitate upon heating, it is preferred that they be calcined prior to utilization.

As discussed above, it has been observed that the glass batch formulations to which the teachings of Seng, U.S. Pat. No. 4,212,613, are well adapted are the low alkali or alkali free glasses. Such glass batches have been observed to be of a relatively larger particle size than those glass batch formulations where it has been observed that such pellet forming means control did not produce the desired sensitivity and control. For example, the low alkali glass batch formulations which did produce the desired results, had a surface area of about 0.6 to about 0.7 square meters per cubic centimeter of batch and had an average particle diameter of between about 29–30 microns. In contrast, alkali-alkaline earth, glass batch formulations containing, on a theoretical oxide basis, between about 10 to about 20% by weight of $Na_2O$ had a surface area of between about 0.3 to about 0.4 square meters and an average particle diameter between about 110 to about 120 microns. Outstanding results will be obtained by practicing the present invention relative to the teaching of Ser. No. 809,595 when employing a batch in which the particle size of the batch to be pelletized is as follows: 100% of the particles are smaller than about 300 microns; about 69 to 70% are smaller than 212 microns; about 51 to 52% by weight are smaller than 106 microns; about 45 to about 46% are smaller than 53 microns; about 25 to 26% by weight are smaller than 13 microns and about 6 to 7% by weight are smaller than 4 to 5 microns.

The foregoing references to particle size, as well as surface area and average particle diameter, are based on an analysis provided by a particle size analyzer employing light scattering principles. The analyzer is sold commercially by L & N under the designation Micro Trac Analyzer.

When the proper speed to angle ratio has been set for the pelletizer, i.e., the pellets gradually increase in size and fall off the disc as a function of weight rather than being carried into the finished pellet stream by centrifugal force, the sensor position can be determined. The general location of the sensor is determined by measuring the shortest distance from the edge of the pelletizer to the center of the whirlpool that is formed in the material by the rotation thereof and then measuring the same distance from the center of the whirlpool towards the center of the disc along a radius from the center to the aforesaid point on the edge of the disc. This method determines the general location of the sensor; however, pelletizing is an art, thus requiring minor adjustments of the position for optimum results on any specific glass batch. Assuming that the uppermost portion of the disc is the 12 o'clock position, the sensor will be positioned in the essentially finished pellet stream within the range of 7–9 o'clock, with the 8 o'clock position being preferred.

It has been found that the depth of the pellets at the point of sensing is determined by the angle of the pelletizer, speed of rotation of the rotary disc, the height of the wall adjacent the disc and the size of the pellets; it is not dependent on the pellet throughout. If the first three items remain constant, then the depth of the pellets is a function of the size of the essentially finished pellets. The angle of repose of the pellets, i.e., the angle between the surface of the disc and the top layer of pellets in the essentially finished pellet stream is also determined by the four factors described above. The angle of repose is inversely proportional to the size of the pellets; smaller pellets tend to stack at a steeper grade than larger pellets, resulting in an increasing angle of repose as the size of the pellets decreases. The depth of the pellets that is measured by the sensor is the distance from the surface of the disc to the top layer of pellets in the essentially finished pellet stream. Therefore, the depth of the pellets and the angle of repose are functionally related, since the depth of the pellets increases as the angle of repose increases.

As discussed above, the present invention provides an excellent method of and apparatus for pelletizing a batch of particulate material for the alkali-alkaline earth-aluminoborosilicate glasses; however, the present invention is not limited thereto, since it will provide an accurate and reliable means of control for other glass batches as well. In addition, it should be noted that, in accordance with the principles of the present invention, the ratio of liquid to particulate batch material may be changed by changing either the quantity of liquid or particulate batch material supplied to the pelletizer. Preferably, the ratio is proportionately changed in response to the incremental changes of the sensor.

In addition, a sensor assembly is disclosed; the assembly is described and claimed in a separate U.S. application Ser. No. 171,514 which is a continuation-in-part of Ser. No. 974,417, which was filed on the same day as the parent of this application and has a common specification, inventorship and assignee with the parent application. The sensor assembly comprises a pivoted paddle that is deflected by the pellets and a transducer that is operatively connected to the paddle for providing a signal that is indicative of the position of the paddle. The paddle is cammed against the transducer in one direction so that deflection of the paddle causes motion of the transducer. When the force of the pellets against the paddle has been removed, a suitable force producing means moves the paddle in the opposite direction. The transducer has a limited range of movement so that an erroneous indication is not produced at restart by the pellet load moving past the paddle in an upward, rather than a downward direction. Such movement causes the paddle to deflect, but the transducer only follows the paddle until it reaches its limit position. Accordingly, the sensor assembly provides a high degree of sensitivity and accuracy for controlling the pelletization of any glass batch.

Other objectives, advantages and applications of the present invention will be made apparent by the following detailed description of the preferred embodiments of the invention.

DETAILED DESCRIPTION OF PREFERRED EMBODIMENTS

Figure 1:
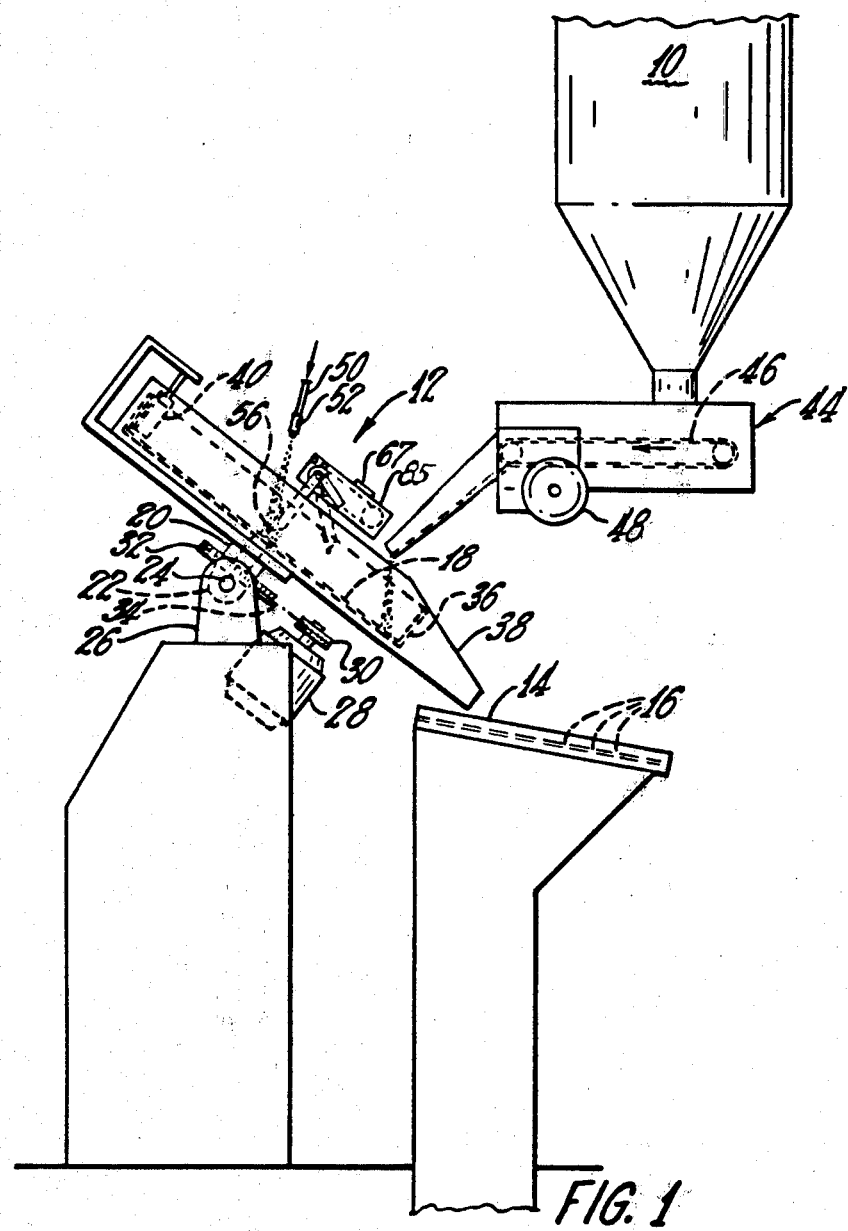
FIG. 1 is a schematic view in elevation of an apparatus for forming batch material into pellets.
Figure 2:
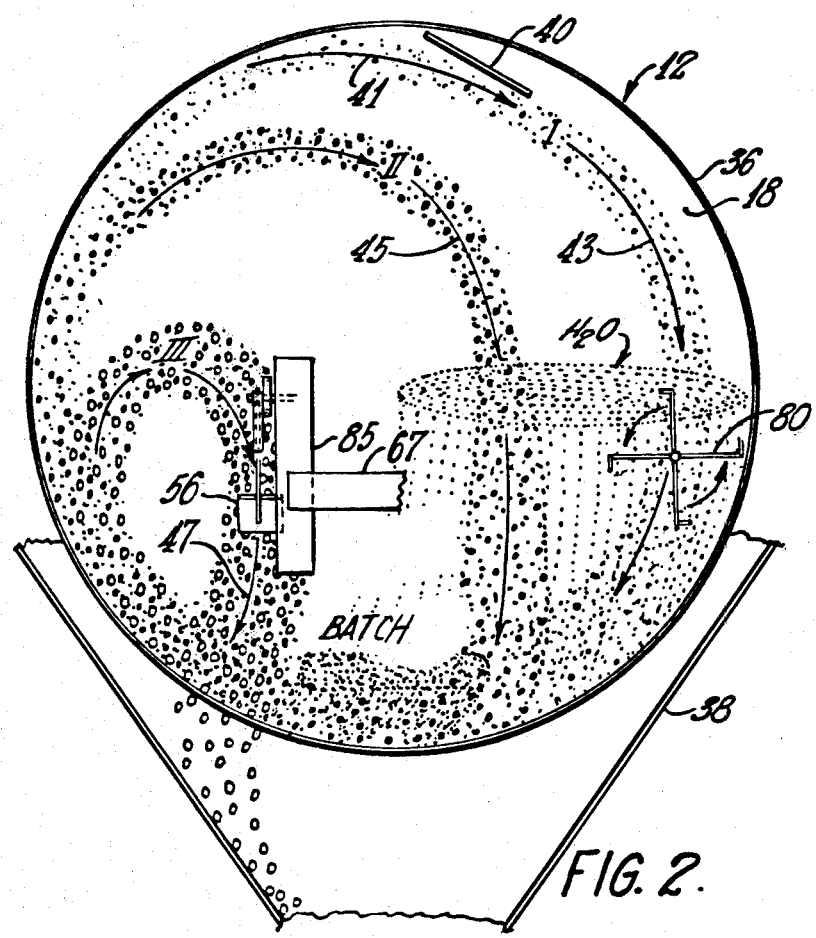
FIG. 2 is an enlarged, diagrammatic view of a disc of the pelletizing apparatus of FIG. 1.

Referring to FIGS. 1 and 2, a particulate, which may be a heat-softenable glass batch material, is provided by a supply hopper 10 to a pelletizer 12 by means of a suitable feeder 44, which is shown as having a conveyor belt 46 that is driven by a motor 48. Other types of batch feeders, such as vibratory feeders, can also be utilized with the present invention; therefore, the batch feeder described should be interpreted as exemplary and not in a limiting sense.

Pelletizer 12 includes a movable surface in the form of a rotatable member or disc 18. In the description of pelletizer 12, the uppermost portion of disc 18 is considered to be the 12 o'clock position. Disc 18 is rotatably carried on a bearing housing 20 which is pivotally mounted on ears 22. Ears 22 are carried on an axle 24 which is mounted on a stand 26. Disc 18 is rotated by a motor 28 through drive and driven sprockets 30 and 32 and chain 34. Disc 18 is surrounded by an annular partition or wall 36.

Batch from supply hopper 10 may be fed to a lower central portion of disc 18, i.e., along a chord of disc 18 between about the 5:30 and 6:30 o'clock positions, by feeder 44. Water is supplied to a middle right-hand portion of disc 18 by a supply line 50 and a nozzle 52. The water may be supplied in a flat spray at roughly a 3 o'clock position and may have a length extending from one third to one half of the diameter of disc 18. Preferably, the water may be furnished by sprays located generally on a chord between the 4 and 8 o'clock positions but to the right of a diameter running through the 6 and 12 o'clock positions of disc 18.

With disc 18 slanted at a predetermined angle to the horizontal, such as forty degrees, as determined by the position of ears 22 on axle 24, and rotating in a clockwise direction, the batch moves in generally elliptical patterns as it is carried in a clockwise direction up the periphery of disc 18 and then down disc 18 at least partially under the influence of gravity. More specifically, the particulate batch moves in an arcuate upward path around the periphery of disc 18, adjacent wall 36, and the downward travel of the batch and partially-formed pellets may be viewed as being along three rather distinct paths.

As the seeds develop in size, becoming larger and approaching the size of the finished pellets, the force imparted by the rotational motion of the pelletizer is not sufficient to maintain a circular path around the periphery of the pellitizer; therefore, the pellets fall of their own weight forming an elliptical path. As the pellets become larger in size, their path becomes shorter and more elliptical since they fall sooner under the influence of gravity. Accordingly, the largest pellets, i.e., the pellets approaching the size of the completely formed pellets, form the smallest elliptical path.

For the sake of explanation, disc 18 may be divided into three sections to show the paths of downwardly moving batch and partly-formed pellets. It should be noted, however, that the sections, as shown in FIG. 2, are not discrete and separate, but rather contiguous and gradually or generally continuously changing across the cross section of the pelletizer. In path 43 of Section I adjacent the periphery of disc 18 are the non-adhering seeds or nuclei. Section II, which is located inward of Section I in the direction of the center of the elliptical paths formed by the movement of the pellets, has a path 45 containing partially formed pellets. Section III, in which the sensor is positioned, as discussed in detail below, has a path 47 which denotes the tightest elliptical path of the pellets, such pellets being almost finished. The essentially finished pellets move in a continuous tight elliptical path until they tumble over wall 36 onto trough 14 which has openings 16 through which the smaller or broken pellets fall. The finished pellets may then be supplied to a suitable vertical conveyor and carried to the top of a heat exchanger for preheating prior to being placed in a melter. Preferably, the pellets are dried and preheated in accordance with the teachings of Hohman, Seng, Henry and Propster in U.S. Pat. Nos. 4,248,615 and 4,248,616.

A scraper 80, which rotates in a direction opposite to the rotational direction of disc 18, i.e., in a counterclockwise direction, is positioned in approximately the 4 o'clock position of pelletizer 12. Scraper 80 removes any accumulated material which may tend to build up on the periphery of disc 18 and reintroduces it into the circulation of batch. Scraper 80 may be used in place of stationary scrapers or may be used in conjunction therewith. Preferably, the rotary scraper includes two pairs of generally normally relates arms with each arm having a radius of about one half of the radius of the pelletizer disc and has its axis of rotation about midway along the radius of disc 18 drawn to about the 3 o'clock position. One pair of arms, which may be viewed as a diameter of the circle through which the device rotates, includes scrapers at its diametric end portions adapted to scrape the side wall of the pelletizer. The other pair of arms include diametrically opposed scrapers operating closely adjacent to the bottom of disc 18.

Disc 18 is also provided with a stationary plow 40 extending inwardly from about the 12 o'clock position, but more preferably, extending inwardly from about the 11:30 o'clock position and intersecting a diameter through the 6 and 12 o'clock positions at an angle of about 45°. Plow 40 directs the batch material and any formed non-adhering seeds into the circulating stream within the pelletizer. Other stationary plows may be used, if necessary, to prevent the mixed material from accumulating and clogging the pelletizer.

The present invention concerns sensing either the depth of the substantially finished pellets or the angle of repose of the substantially finished pellets at a downward portion of an elliptical path, the depth or angle of repose being indicative of the size of the finished pellets, and then controlling the liquid to particulate batch material ratio in response thereto. The angle of repose of the substantially finished pellets in FIG. 2 is the angle between the surface of disc 18 and the top layer of pellets in path 47. Similarly, the depth of the substantially finished pellets in FIG. 2 is the distance between the surface of disc 18 and the top layer of pellets in path 47.

When the proper speed to angle ratio has been set for the pelletizer, i.e., the pellets gradually increase in size and fall off the disc as a function of weight rather than being carried into the finished pellet stream by centrifugal force, the sensor position can be determined. The general location of the sensor is determined by measuring the shortest distance from the edge of the pelletizer to the center of the whirlpool (which is shown generally by numeral 101) that is formed in the material by the rotation thereof and then measuring the same distance from the center of the whirlpool towards the center of the disc along a radius from the center to the aforesaid point on the edge of the disc. This method determines the general location of the sensor; however, pelletizing is an art, thus requiring minor adjustments of the position for optimum results on any specific glass batch. Assuming that the uppermost portion of the disc is the 12 o'clock position, the sensor will be positioned in the essentially finished pellet stream within the range of 7–9 o'clock, with the 8 o'clock position being preferred.

The liquid provided to the pelletizer may be controlled according to a variety of schemes. For example, aforementioned U.S. Pat. No. 4,212,613, Seng, discloses a system for controlling the water supplied to the pelletizer by employing two lines, one line supplying a constant flow of water to a main supply line and a second line containing a solenoid valve and also being in fluid communication with the main supply line. The continuous flow line provides an insufficient amount of water for continuous use, and the combined supply of the two lines provides an excessive amount of water for continuous use. The valve in the second line is actuated by a paddle; the paddle causes the valve to open and close so that the water is supplied above or below the average desired quantity when the paddle moves through the threshold level. Alternatively, the liquid may be provided in discrete steps in response to movement of a paddle in steps, such as where a paddle actuates a plurality of limit switches, as it travels through its arc, with the limit switches controlling a plurality of water lines, thus varying the water in discrete steps. Preferably, the water is proportionately controlled to provide a water flow that is continuously responsive to the incremental change of the pellets.

Figure 3:
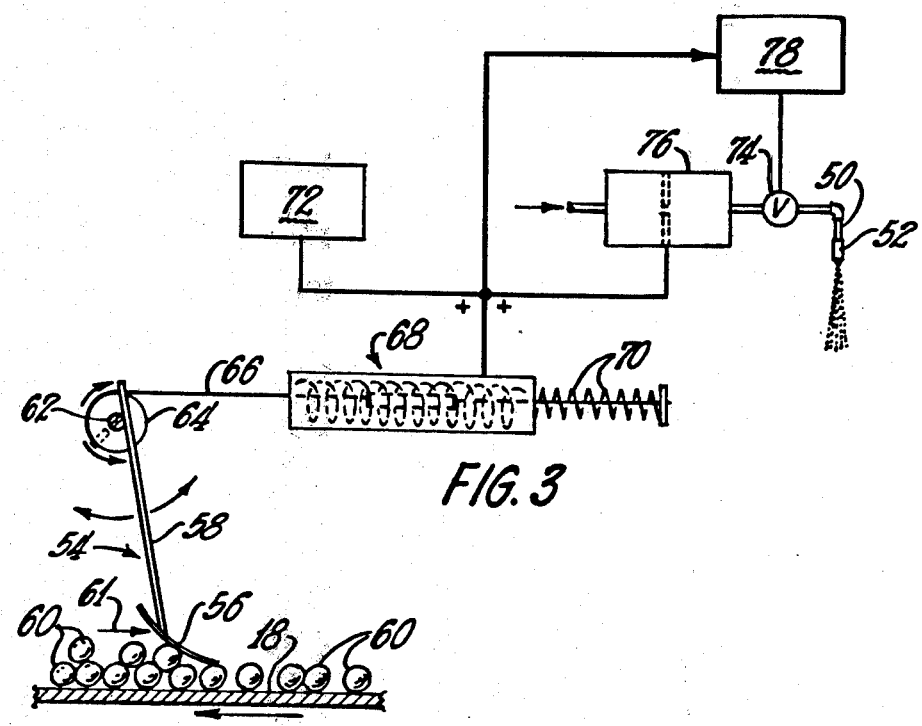
FIG. 3 is a diagrammatic view of controls for proportioning the amount of liquid to batch material in response to a sensing device.

A device for gradually and continuously changing the ratio of liquid or water to particulate batch material in response to incremental movements of the sensor is shown in FIG. 3. A paddle 54, which is positioned in pellet stream 47 in accordance with the principles of the invention, is deflected in the direction of arrow 61, which represents a downward direction, by movement of pellets 60 in the direction of arrow 61 against blade 56 of paddle 54. Blade 56 is attached to a shaft 58 that is rotatably connected to a shaft 62 which, in turn, is connected to a pulley 64. One end of wire 66 is attached to pulley 64, and the other end is attached to the movable member of linear motion transducer 68. The output of transducer 68 is responsive to the movement of wire 66, which is a function of the deflection of paddle 54. Spring 70 is attached to the opposite end of the movable member of transducer 68 so that it opposes the force exerted through wire 66. Movement of paddle 54 in the direction of arrow 61 under the influence of moving pellets 60 deflects shaft 58 thus rotating pulley 64 counterclockwise and pulling wire 66 out of transducer 68 against the force of spring 70. As the level of pellets 60 diminishes, spring 70 causes paddle 54 to rotate in the clockwise direction.

A signal generator 72 provides a reference signal which may be a pure reference or may be indicative of a desired water flow. A sensing means 76, which may be a differential pressure cell, measures the flow of water through valve 74 to line 50 and nozzle 52 and produces a signal indicative of the measured water flow. The signals from transducer 68 and sensing means 76 produce signals indicative of the actual paddle position and the actual water flow. These measured signals are then compared with the reference signal from generator 72 to produce an error signal. The error signal is used to drive valve controller 78 which is connected to valve 74, in a direction to reduce the error signal; valve controller 78 may be, for example, a pneumatic cell. In this control scheme, the reference signal is used as a set signal and may be compared with either the paddle position signal, the water flow signal or with combined paddle position and water flow signals. For control purposes, any suitable control algorithm may be used, such as proportional, integral, derivative or any combination thereof. A more complete description of a control system which may be used with the device disclosed herein is shown in copending U.S. applications Ser. No. 232,068, which was a continuation of 974,419, Varrasso and Ser. No. 974,456 which is now U.S. Pat.

No. 4,251,475, Varrasso and Henry, both of which were filed concurrently with the parent of the subject application; all of such applications are assigned to a common assignee.

Figure 4:
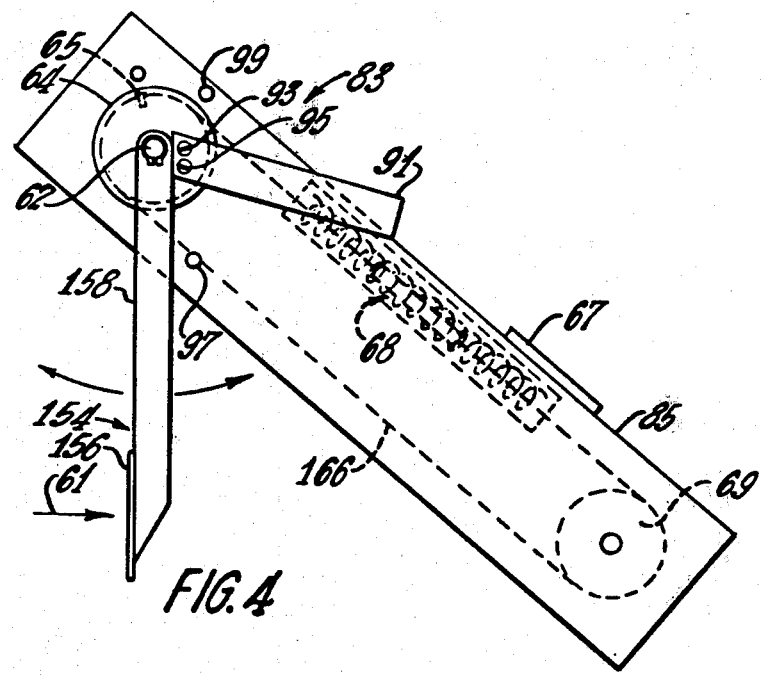
FIG. 4 is a detailed view of a paddle transducer assembly.

Referring now to FIG. 4, sensor assembly 83 has a mounting means 85 which may be a block or other suitable support for mounting the individual parts of the assembly. Mounting means 85 is attached to support 67 (partially shown) such that mounting means 85 is parallel to the surface of disc 18 (refer to FIG. 1). Shaft 158 is mounted for free pivotal movement on shaft 62 which is attached to mounting means 85. Also mounted on shaft 62 is a drive means for wire 166, such as pulley 64. Fixably mounted to pulley 64 is a means for providing a rotational force in the clockwise direction to pulley 64 which may be a counterweight 91 attached to pulley 64 by suitable fasteners. The ends of wire 166 are attached to opposite ends of the movable member of linear motion transducer 68, and wire 166 is wound around pulley 64 and second pulley 69 to form a continuous loop so that transducer 68 may be operated in both directions. A fastener 65 attaches wire 166 to pulley 64, the pulley 69 is attached to mounting means 85.

The movement of counterweight 91 is limited by stop 97 in the clockwise direction and stop 99 in the counterclockwise direction, which are attached to mounting means 85. Such constraint also limits the movement of pulley 64, thus limiting the movement of transducer 68 to maintain the output thereof within the correct range. Pellets 60 moving in the direction of arrow 61, which represents a downward direction, contact blade 156 causing paddle 154 to deflect in the counterclockwise direction. Shaft 158 of paddle 154 engages counterweight 91 and causes it to rotate from stop 97 in a counterclockwise direction towards stop 99. As counterweight 91 rotates, it rotates pulley 64, thus winding wire 66 and altering the position of transducer 68, which provdes an indication of the position of paddle 154. If the depth of the pellets decreases, paddle 154 and pulley 64 are moved in the clockwise direction by counterweight 91. Accordingly, wire 166 is wound in the opposite direction and transducer 68 is displaced in the opposite direction.

When counterweight 91 has reached its extreme position in the clockwise direction against stop 97, continued movement of paddle 154 in the clockwise direction does not change the output of transducer 68. This feature is significant during start-up of pelletizer 12. At such time the bulk of the pellets will be either below paddle 154 or to the right thereof, as viewed in FIGS. 1 and 2. Starting the pelletizer will cause the pellets to move past paddle 154 in an upward rather than a downward direction, thus deflecting paddle 154 in the clockwise direction. However, the output of transducer 68 will not be affected since the movement of counterweight 91 will be limited by stop 97. Consequently, paddle 154 does not provide an erroneous reading during the start-up phase. If desired a stop may be provided for paddle 154 to limit its movement in the clockwise direction, for example, at the 11:30 o'clock position, as viewed in FIG. 4.

Additionally, paddle 154 may be swung free of the pellets and the pelletizer any time during the process, including start-up when it is desired to manually adjust the liquid or particulate input into the pelletizer. By rotating shaft 158 to approximately the 3:00 o'clock position, as viewed in FIG. 4, either the liquid or particulate may be adjusted to proper proportion. In this manner a proper mechanical zero for paddle 154 may be established. After calibration, paddle 154 is rotated back by counterweight 91 to be deflected by pellets 60 moving in the direction of arrow 61.

The device shown in FIG. 4 requires a means to move pulley 64 in the opposite direction to its movement under the force of pellets 60 against blade 156. Counterweight 91, which provides a force under the influence of gravity, has been disclosed; however, any other suitable device may be used, such as an electrical pneumatic or mechanical device.

A time delay may be used, as necessary, to provide sufficient time for the pellet load to build up before placing paddle 154 in operation; this would be especially useful during restart where several or more layers of pellets are present during the steady state, but some of the load was spilled during the stoppage of the operation. In restart, the load would be less than the steady state load; therefore, the level of the pellets would be below the paddle position causing the paddle to provide an erroneous reading. The delay timer would disconnect the output signal of the paddle assembly from the control unit for a predetermined time to allow the load within the pelletizer to build up to its steady state level. This delay time must be determined empirically for each operation, since it depends upon the size of the pelletizer, ingredients of the batch, incline of the pelletizer, and the amount of load that is spilled when the pelletizer is stopped. The delay timer can also be used in the initial start-up of the pelletizer to disconnect the sensor output from the control unit until steady state conditions have been reached.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

I claim:

1. A method of pelletizing particulate batch material for use in a glass melting furnace, the method comprising the steps of:

a. supplying particulate batch material having an average particle diameter of 110–120 microns and which contains on a theoretical oxide basis between 10–20 percent by weight of $Na_2O$, to a slanted rotatable surface;

b. supplying liquid to the slanted rotatable surface to render the batch particles with the ability to adhere to one another upon impaction;

c. rotating the slanted rotatable surface in a given direction to cause the material on the surface to move up along the surface and then downwardly at least partially under the influence of gravity so as to move in generally elliptical paths, whereby individual particles are caused to impact against one another and adhere thereto to form pellets, the size of the substantially finished pellets being in the range of $\frac{3}{8}$ inch to $\frac{5}{8}$ inch in diameter;

d. sensing the diameter of substantially finished pellets at a downward portion of an elliptical path by placing a sensor in a position above the slanted rotatable disc determined by measuring the shortest distance from the edge of the pelletizer to the center of the elliptical path progressed by substantially finished pellets and then measuring this distance toward the center of the pelletizer and placing the sensor in this position such that it intercepts the downward elliptical path of the pellets as they fall due to gravity against the motion of the upward moving rotating surface; and e. changing the ratio of liquid to batch supplied to the slanted rotatable surface in response to a change in the diameter of the substantially finished pellets which are sensed.

2. A method as recited in claim 1 wherein the ratio of liquid is gradually and continuously changed in response to incremental movements of the sensor.

3. A method as recited in claim 1 wherein the particle size distribution of the particulate batch material is such that 100 percent of the particles are less than 300 microns in diameter, 69–70 percent are less than 212 microns in diameter, 51–52 percent are less than 106 microns in diameter, 45–46 percent are less than 43 microns in diameter, 25–26 percent are less than 13 microns in diameter, and 6–7 percent are less than 4–5 microns in diameter.

4. A method as recited in claim 1 wherein the position of the sensor which senses the diameter of substantially finished pellets is on the downward portion of the elliptical path progressed by the substantially finished pellets between about the 7 to 9 o'clock position of the slanted rotatable surface with the highest point of the slanted rotatable surface being the 12 o'clock position.

5. A method as recited in claim 1 wherein the position of the sensor which senses the diameter of substantially finished pellets is on the downward portion of the elliptical path progressed by the substantially finished pellets at about the 8 o'clock position of the slanted rotatable surface with the highest point of the slanted rotatable surface being the 12 o'clock position.

6. An apparatus for pelletizing particulate batch material for use in a glass melting furnace which contains on a theoretical oxide basis between 10–20 percent by weight of $Na_2O$, the apparatus comprising:

a. a pellet forming means having a movable surface comprising a slanted rotatable member;

b. a means for supplying particulate batch material to the pellet forming means where the average particle size diameter is between 110–120 microns;

c. means for supplying liquid to the pellet forming means;

d. means for rotating the rotatable member in a given direction to cause the particulate batch material to move upwardly and then downwardly at least partially under the influence of gravity so as to move in generally elliptical paths, the apparatus being so arranged and constructed that the liquid and particulate batch material combine to form substantially finished pellets having a diameter of $\frac{3}{8}$ inch to $\frac{5}{8}$ inch;

e. means for sensing the diameter of substantially finished pellets at a downward portion of a generally elliptical path;

f. means for positioning the sensing means above the slanted rotatable member such that the position of the sensing means is defined by measuring the shortest distance from the edge of the pelletizer to the center of the elliptical path progressed by substantially finished pellets and then measuring this distance toward the center of the pelletizer and placing the sensor in this position such that it intercepts the downward elliptical path of the pellets as they fall due to gravity against the motion of the upward moving rotating surface; and g. means for changing the ratio of liquid to particulate batch material in response to the diameter of substantially finished pellets sensed by the sensing means.

7. An apparatus as claimed in claim 6 wherein the ratio of liquid is gradually and continuously changed due to incremental movement of the sensor.

8. An apparatus as recited in claim 6, wherein the position of the sensing means is on the downward portion of the elliptical path progressed by the substantially finished pellets between about the 7 to 9 o'clock position of the slanted rotatable surface with the highest point of the slanted rotatable surface being the 12 o'clock position.

9. An apparatus as recited in claim 6, wherein the position of the sensing means is on the downward portion of the elliptical path progressed by the substantially finished pellets at about the 8 o'clock position of the slanted rotatable surface with the highest point of the slanted rotatable surface being the 12 o'clock position.

* * * * *